(12) United States Patent
Gu et al.

(10) Patent No.: US 8,989,490 B2
(45) Date of Patent: Mar. 24, 2015

(54) FEATURE SENSITIVE CAPTIONING OF MEDIA CONTENT

(71) Applicant: Disney Enterprises, Inc., Burbank, CA (US)

(72) Inventors: Jinsong Gu, Agoura Hills, CA (US);
Amy Ilyse Rosenthal, Beverly Hills, CA (US); Gillian Salit, Los Angeles, CA (US); Scott Gerlach, Redmond, WA (US); Andrea Kuhnertova, Venice, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 13/945,802

(22) Filed: Jul. 18, 2013

(65) Prior Publication Data
US 2015/0023597 A1    Jan. 22, 2015

(51) Int. Cl.
*G06K 9/34*       (2006.01)
*G06F 17/24*      (2006.01)
*G06T 7/00*       (2006.01)

(52) U.S. Cl.
CPC ............ *G06F 17/241* (2013.01); *G06T 7/0079* (2013.01); *G06T 7/0081* (2013.01)
USPC ............................ 382/176; 382/173; 382/190

(58) Field of Classification Search
USPC .................... 382/176, 190, 173; 348/E5.022, 348/E5.057; 707/E17.116, 999.001, 707/999.002, 769; 704/277, E15.045; 1/1; 715/243, 247, 252, 716, 730, 764, 783; 725/10, 14, 34, 112, 115, 78, 88; 709/217
See application file for complete search history.

(56) References Cited

U.S. PATENT DOCUMENTS

| 6,760,916 | B2* | 7/2004 | Holtz et al. | 725/34 |
| 8,091,021 | B2* | 1/2012 | Bargeron et al. | 715/247 |
| 8,763,060 | B2* | 6/2014 | Jerremy | 725/110 |
| 8,843,825 | B1* | 9/2014 | Whitman et al. | 715/730 |

* cited by examiner

*Primary Examiner* — Anh Do
(74) *Attorney, Agent, or Firm* — Farjami & Farjami LLP

(57) ABSTRACT

There are provided methods and systems for use in performing feature sensitive captioning of media content. In one implementation, such a method includes detecting an aesthetically determinative feature of a media content unit selected by a user, and determining a captioning aesthetic for a caption of the media content unit based at least in part on the aesthetically determinative feature. The captioning aesthetic may include a background aesthetic and a text aesthetic. The captioning aesthetic may be utilized by a feature sensitive captioning application to produce a feature sensitive caption for the media content unit.

20 Claims, 4 Drawing Sheets

FEATURE SENSITIVE CAPTIONING OF MEDIA CONTENT

BACKGROUND

The wide adoption by consumers of mobile telephones having video and/or still image capture functionality has resulted in almost everyone being in possession of a digital camera almost all of the time. The ease and convenience with which digital media content can now be produced, stored, and shared, encourages the use of digital photography as the technology of choice for capturing images of friends, family, travel, and special events. However, the very ease and abundance with which digital photographs can now be generated and archived can render that media content incoherent absent a narrative thread or descriptive cues to guide a viewer's attention.

One way of imposing coherence on a collection of digital photographs or other media content is to provide captioning that describes the people, places, or events shown by a digital image, or that enhances the experience of viewing the digital image by providing insightful or humorous commentary. Conventional solutions to providing captioning for media content typically adopt a "one style suits all" approach in which a universal background and a universal text font and/or color are predetermined for use in all cases. However, that conventional approach is at best generic and visually uninteresting, and at worst may be ineffective in producing a clearly legible caption due to lack of contrast between the default background and/or text characters and the image being captioned. Moreover, even when used successfully to provide a legible caption, the conventional approach fails to draw in and engage either the user creating the caption or the viewer of the captioned media content. As a result, the conventional approach to captioning media content can deprive both the user and the viewer of the potential enjoyment derivable from captioning that is aesthetically resonant with the media content it describes.

SUMMARY

There are provided methods and systems for performing feature sensitive captioning of media content, substantially as shown in and/or described in connection with at least one of the figures, and as set forth more completely in the claims.

DETAILED DESCRIPTION

Figure 1:
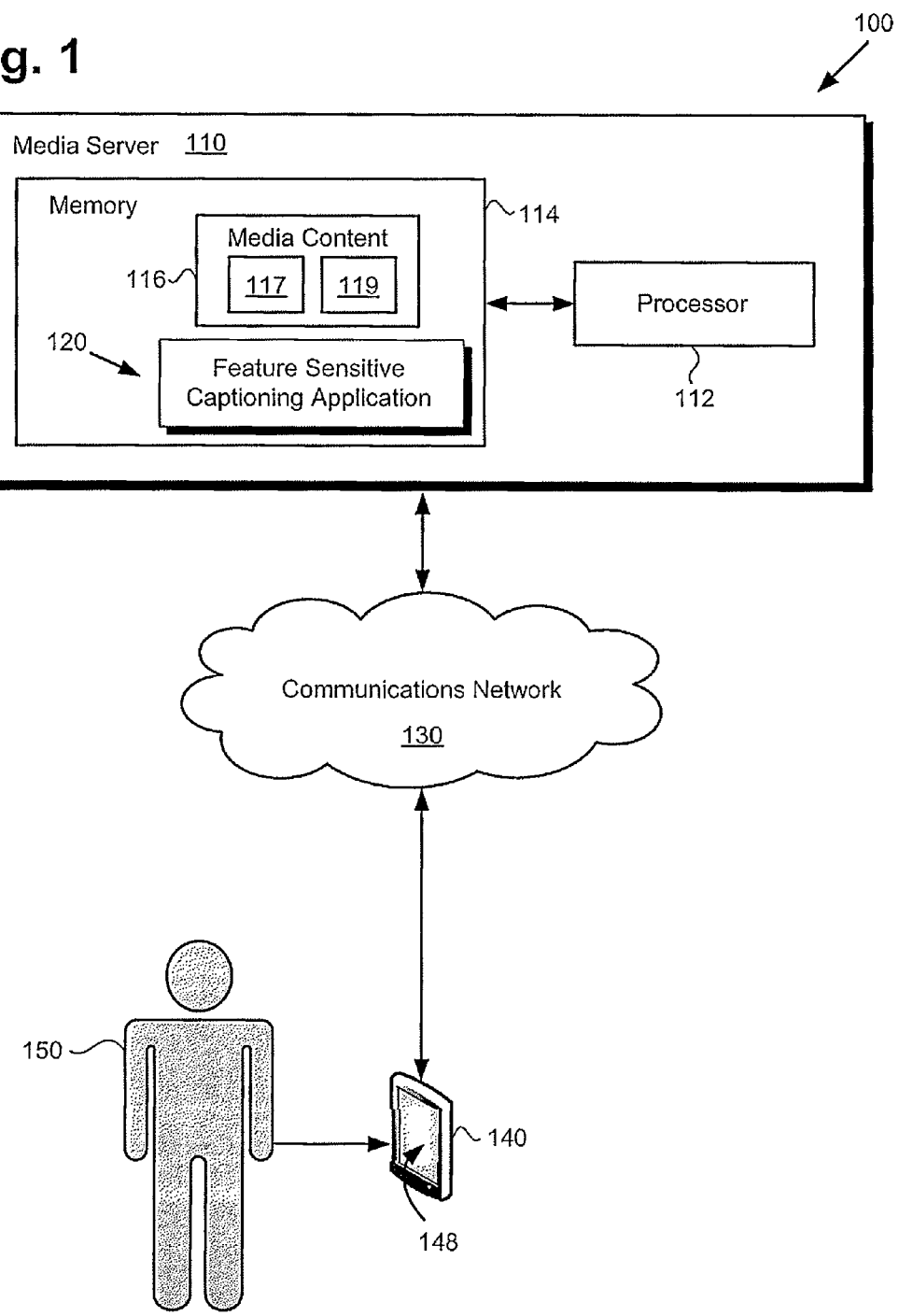
FIG. 1 shows a diagram of an exemplary system for performing feature sensitive captioning of media content, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As explained above, conventional solutions to providing captioning for media content typically adopt an approach in which a universal background and a universal text font and/or color are predetermined for use in all cases. Such a conventional approach is at best generic and visually uninteresting, and at worst may be ineffective in producing a clearly legible caption due to lack of contrast between the default background and/or text characters and the image being captioned. Moreover, and as further noted above, even when used successfully to provide a legible caption, the conventional approach fails to draw in and engage either the user creating the caption or the viewer of the captioned media content. As a result, the conventional approach to captioning media content can deprive both the user and the viewer of the potential enjoyment derivable from captioning that is aesthetically resonant with the media content it describes.

The present application discloses an automated solution for producing captioning that is sensitive to one or more aesthetically determinative features of a media content unit. In addition, by automating an intelligent approach to determining a captioning aesthetic based at least in part on the one or more aesthetically determinative features, the present concepts enable even a novice or artistically challenged user to produce visually pleasing and aesthetically engaging captioning.

As used in the present application, the expression "media content unit" can refer to any cognizably discrete collection of media content data. For example, in some implementations, a media content unit may take form of one or more digital photographs, some or all of which may have been taken by a user, for example. In other implementations, a media content unit may include one or more frames of video content captured by the user, for example. In yet other implementations, a media content unit may correspond to one or more digital images acquired by the user, for example, through commercial purchase, authorized free data transfer, or authorized sharing with another user.

FIG. 1 shows a diagram of exemplary system 100 for performing feature sensitive captioning of media content, according to one implementation. System 100 includes media server 110 in communication with user device 140 over communications network 130. As further shown in FIG. 1, media server 110 includes server processor 112, and server memory 114 storing feature sensitive captioning application 120, and media content 116 including media content units 117 and 119. Also shown in FIG. 1 are display 148 of user device 140, and consumer or user 150 (hereinafter "user 150") utilizing user device 140 to access media server 110 over communications network 130.

It is noted that although FIG. 1 depicts media content 116 and feature sensitive captioning application 120 as being mutually co-located in server memory 114, that representation is merely provided as an aid to conceptual clarity. More generally, media server 110 may include one or more media servers, which may be co-located, or may form an interactively linked but distributed system. As a result, server processor 112 and server memory 114 may correspond to distributed server processor and server memory resources within system 100. Thus, it is to be understood that media content 116 and feature sensitive captioning application 120 may be stored remotely from on another within the distributed memory resources of system 100. It is further noted that in some implementations, media server 110 may not include media content 116. In those implementations, media content 116 may be an external asset for media server 110, such as a third party asset, for example, accessible over communications network 130.

According to the implementation shown by FIG. 1, user 150 may utilize user device 140 to interact with media server based feature sensitive captioning application 120 over communications network 130. In one such implementation, media server 110 may correspond to one or more web servers, accessible over a packet network such as the Internet, for example. Alternatively, media server 110 may correspond to one or more media servers supporting a local area network (LAN), or included in another type of limited distribution network within a theme park or other entertainment venue, for example.

Although user device 140 is shown as a touch screen mobile telephone in FIG. 1, that representation is also provided merely as an example. In other implementations, user device 140 may be another type of mobile or stationary computing device or system. For example, user device 140 may take the form of a design kiosk in a theme park environment, or may be implemented as any of a desktop computer, a smart television (Smart TV), a laptop computer, a netbook, a tablet computer, a gaming console, and a Smartphone, for example.

As shown in FIG. 1, feature sensitive captioning application 120, under the control of server processor 112, may receive one or more inputs from user 150 over communications network 130. For example, and as will be described in greater detail below, feature sensitive captioning application 120 may receive inputs enabling identification of one of media content units 117 or 119 selected by user 150 for captioning. According to the implementation shown in FIG. 1, feature sensitive captioning application 120 is configured to detect one or more aesthetically determinative features of media content unit 117/119, and to determine a captioning aesthetic for a caption of media content unit 117/119 based at least in part on that aesthetically determinative feature. Feature sensitive captioning application 120 is further configured to produce a feature sensitive caption for media content unit 117/119 utilizing the captioning aesthetic.

Figure 2:
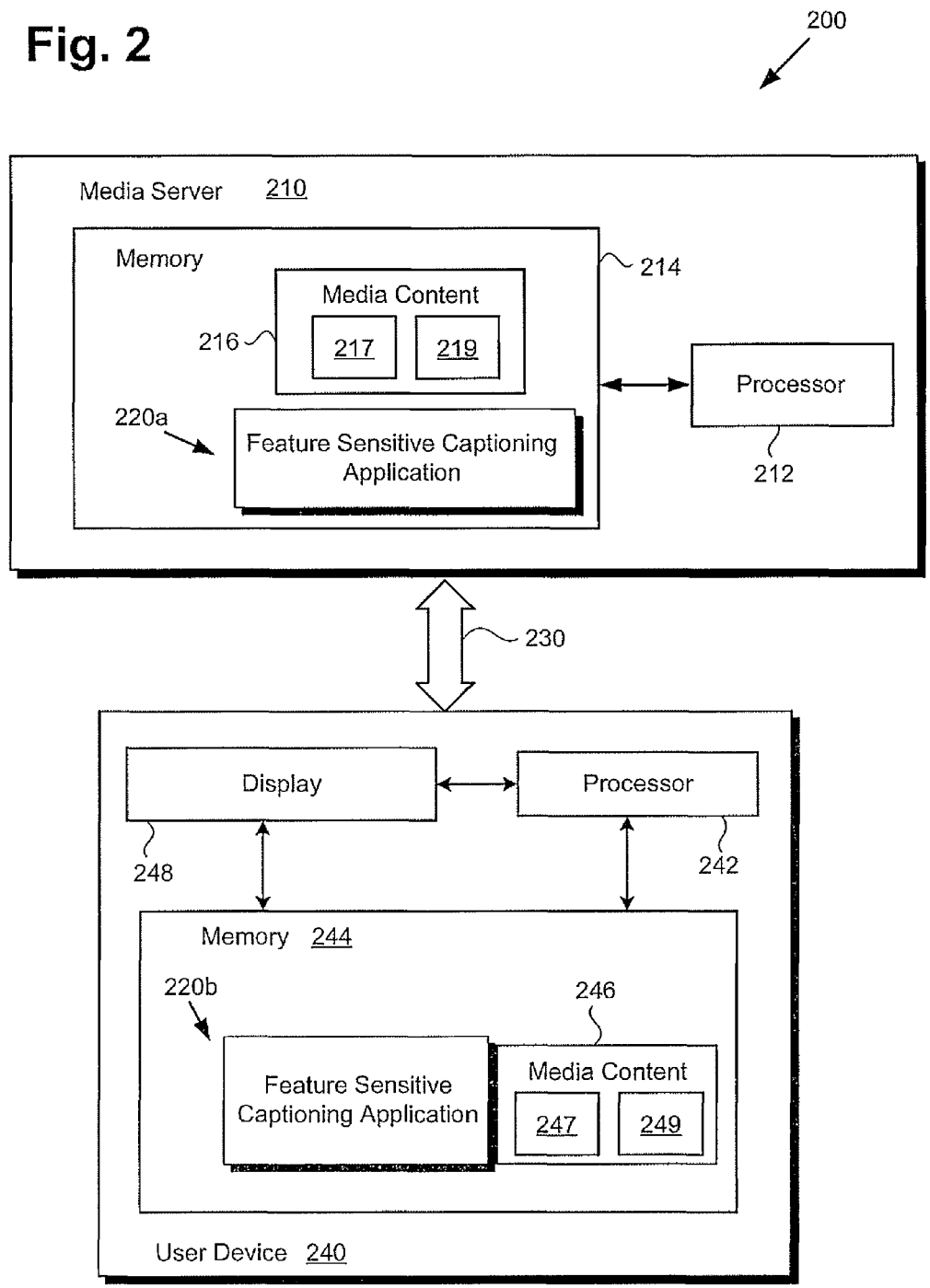
FIG. 2 shows a diagram of an exemplary system for performing feature sensitive captioning of media content, according to one implementation.

Turning now to FIG. 2, FIG. 2 shows a diagram of exemplary system 200 for performing feature sensitive captioning of media content, according to one implementation. System 200 in FIG. 2 shows user device 240 having display 248 and receiving data transfer via communication link 230 from media server 210. Media server 210 is shown to include server processor 212 and server memory 214 storing feature sensitive captioning application 220a, and media content 216 including media content units 217 and 219. Communication link 230, and media server 210 including server processor 212 and server memory 214 storing media content 216 and feature sensitive captioning application 220a correspond respectively to communications network 130 and media server 110 including server processor 112 and server memory 114 storing media content 116 and feature sensitive captioning application 120, in FIG. 1. Moreover, user device 240 having display 248, in FIG. 2, corresponds in general to user device 140 having display 148, in FIG. 1. As shown in FIG. 2, in addition to display 248, user device 240 includes processor 242, and memory 244 storing feature sensitive captioning application 220b and media content 246 including media content units 247 and 249.

According to the implementation shown in FIG. 2, feature sensitive captioning application 220b is located in memory 244 of user device 240, having been received from media server 210 via communication link 230. In the present implementation, communication link 230 represents download of feature sensitive captioning application 220b over a packet network, such as the Internet, for example. Once downloaded to memory 244, feature sensitive captioning application 220b may be run locally on user device 240. Processor 242 may be the central processing unit for user device 240, for example, in which role processor 242 runs the user device operating system, executes feature sensitive captioning application 220b, and controls display 248.

In another implementation, communication link 230 may represent transfer of feature sensitive captioning application 220b from a computer-readable storage medium to memory 244 of user device 240. Such a computer-readable medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable media include, for example, an optical disc, RAM, programmable read-only memory (PROM), erasable PROM (EPROM), and FLASH memory.

Figure 3:
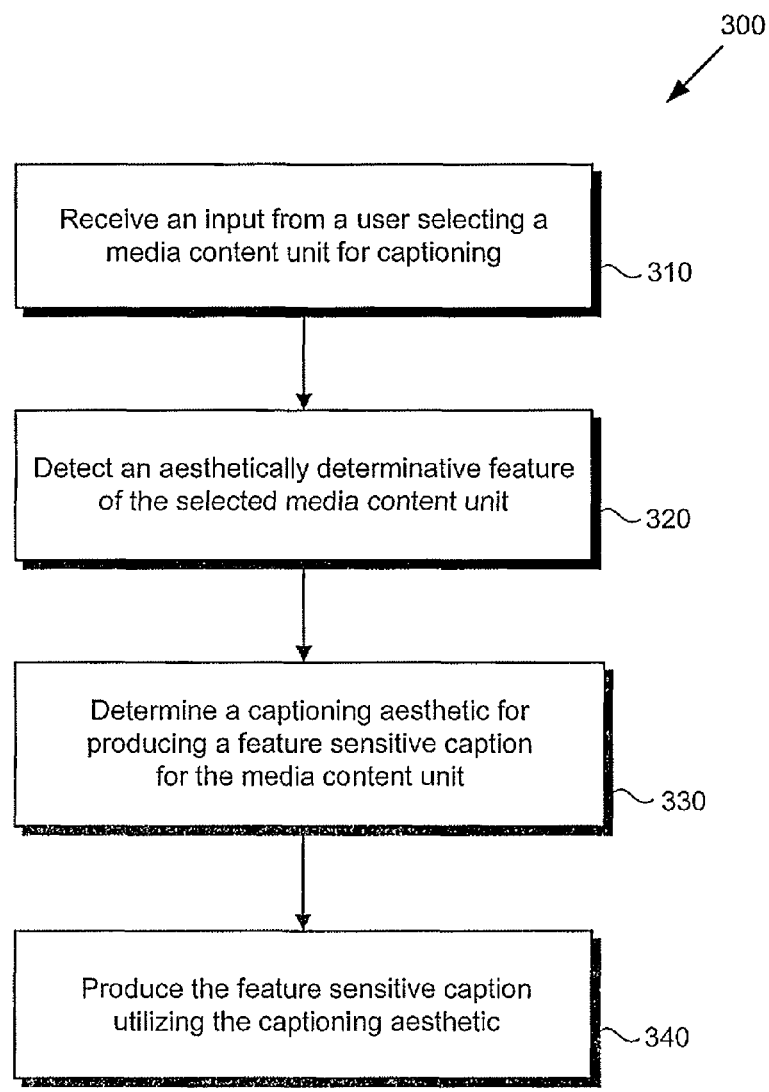
FIG. 3 is a flowchart presenting an exemplary method for use by a system for performing feature sensitive captioning of media content.
Figure 4:
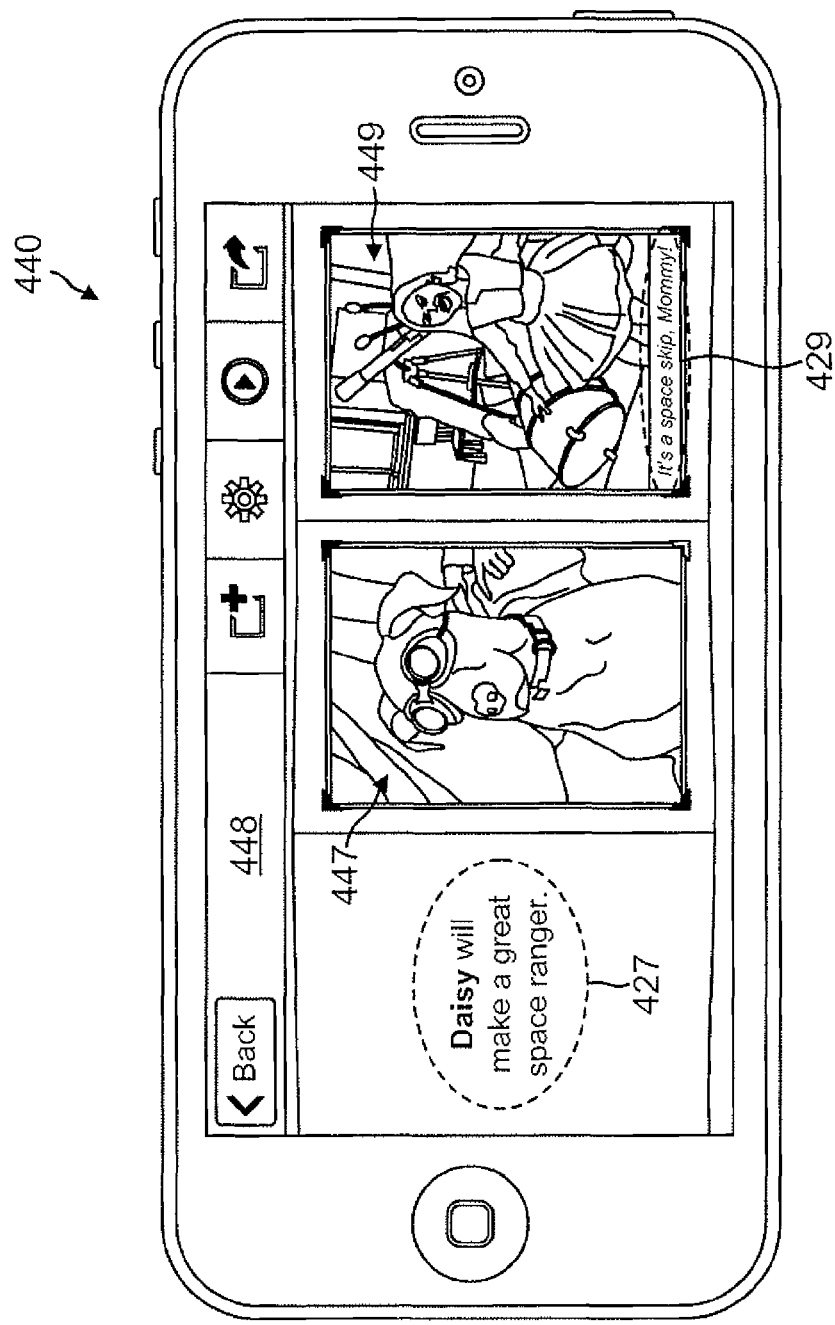
FIG. 4 shows an exemplary representation of a user device display showing media content and corresponding feature sensitive captioning, according to one implementation.

The operation of systems 100 and 200, shown respectively by FIGS. 1 and 2, will now be further described in conjunction with FIGS. 3 and 4. FIG. 3 shows flowchart 300 presenting an exemplary method for use by a system for performing feature sensitive captioning of media content. FIG. 4 shows an exemplary representation of user device 440 including display 448 showing media content unit 447 and its corresponding feature sensitive caption 427, according to one implementation. Also shown in FIG. 4 is media content unit 449 and its corresponding feature sensitive caption 429. User device 440, display 448, and media content units 447 and 449 correspond respectively to user device 140/240, display 148/248, and media content units 247 and 249, in FIGS. 1 and 2. With respect to the method outlined in FIG. 3, it is noted that certain details and features have been left out of flowchart 300 in order not to obscure the discussion of the inventive features in the present application.

Referring to FIG. 3, flowchart 300 begins with receiving an input from a user selecting a media content unit for captioning (310). Referring to FIG. 1, in implementations in which feature sensitive captioning application 120 is a server based application, the receiving can be performed by media server 110. In those implementations, user 150 may utilize user device 140 to select one or more of media content units 117 and 119 for captioning. Media server 110 may be configured to receive the selection data over communications network 130, and to utilize feature sensitive captioning application 120 to identify the media unit or units selected by user 150.

In some implementations, however, feature sensitive captioning application 120 may be a local asset of user device 140, stored on and executed by user device 140. Referring, for example, to FIG. 2, in those implementations the receiving can be performed directly by user device 240. For example, a user corresponding to user 150, in FIG. 1, may utilize user device 240 to select one or more of media content units 247 and 249 stored in memory 244 for captioning. User device 240 may then utilize processor 242 and feature sensitive captioning application 220b to identify the media unit or units selected by the user.

Flowchart 300 continues with detecting an aesthetically determinative feature of the selected media content unit (320). Depending once again on the particular system implementation, detection of the aesthetically determinative feature may be performed either by media server 110/210 or by user device 140/240. For example, in some implementations, media server 110/210 may utilize feature sensitive captioning application 120/220a to detect one or more aesthetically determinative features of media content unit 117/217 or 119/219. In other implementations, user device 140/240 may utilize feature sensitive captioning application 220b to detect one or more aesthetically determinative features of media content unit 247 or 249.

As used in the present application, "aesthetically determinative feature" can refer to any detectable attribute of a media content unit that is usable to characterize or suggest an aesthetic profile of the media content unit. For example, when a media content unit corresponds primarily to a visual image, e.g., a digital photograph, data corresponding to a color or colors appearing in the media content unit can be detected and utilized to characterize or suggest a color palette for the media content unit. In some such implementations, data corresponding to a most prevalent color of the media content unit may be detected and used as the aesthetically determinative feature. In other such implementations, combinations of prevalent colors, distinctive color contrasts, or distinctive or prevalent shapes detected in the media content unit may be used as the aesthetically determinative feature. By way of analogy, when a media content unit corresponds primarily to audio content, e.g., music, data corresponding to notes or lyrics in the media content unit can be detected and utilized to characterize or suggest a thematically or mood related color palette for the media content unit.

Flowchart 300 continues with determining a captioning aesthetic for producing a feature sensitive caption for the media content unit (330). Again, depending upon the particular system implementation, determination of the captioning aesthetic may be performed either by media server 110/210 or by user device 40/240. That is to say, in some implementations, media server 110/210 may utilize feature sensitive captioning application 120/220a to determine the captioning aesthetic, while in other implementations, user device 140/240 may utilize feature sensitive captioning application 220b to determine the captioning aesthetic.

The captioning aesthetic is determined by feature sensitive captioning application 120/220a or 220b based at least in part on the previously detected aesthetically determinative feature, and may include more than one aesthetic component. For example, the captioning aesthetic may include a background aesthetic identifying a suitable shape and/or color for the caption background. In addition, the captioning aesthetic may include a text aesthetic identifying a suitable font style, font size, and/or font color for the caption text. Thus, determination of the captioning aesthetic may include determining a background aesthetic and/or determining a text aesthetic for the feature sensitive caption. Moreover, in some implementations, determination of the captioning aesthetic may include determining a background aesthetic for the feature sensitive caption, and may further include determining a text aesthetic for the feature sensitive caption based at least in part on the background aesthetic.

Flowchart 300 may conclude with producing the feature sensitive caption utilizing the captioning aesthetic (340). The feature sensitive caption may be produced by feature sensitive captioning application 120/220a under the control of system processor 112/212, or by feature sensitive captioning application 220b under the control of processor 242 of user device 140/240. The feature sensitive caption may be produced using caption content selected by the user from a caption library, or may be produced using caption content composed by and received from user 150.

Referring, for example, to FIG. 4, feature sensitive caption 427 is produced utilizing a captioning aesthetic determined based on one or more aesthetically determinative features of media content unit 447. For example, media content unit 447 includes a dominant object in the form of a Dalmatian. The prevalent black and white coloring of the dog, and the dominance of the dog within the imagery shown in media content unit 447 may be utilized to determine the size and color of the background of feature sensitive caption 427. In addition, one or more of those aesthetically determinative features may have been utilized to determine the font style, font size, and font color of the text included in feature sensitive caption 427.

By way of comparison, feature sensitive caption 429 is produced utilizing a captioning aesthetic determined based on one or more aesthetically determinative features of media content unit 449. For example, media content unit 449 includes more numerous but individually less dominant objects than media content unit 447. Due to the narrative or thematic relationship between media content units 447 and 449, in some implementations, the prevalent black and white coloring detected in media content unit 447 may be utilized to determine the background and text color used in feature sensitive caption 429, for aesthetic consistency. However, the relative size of the objects and the colors detected in media content unit 449 may be utilized to determine the font style and font size of the text appearing in feature sensitive caption 429, as well as perhaps the size of feature sensitive caption 429 and its overlay location with respect to media content unit 449 on display 448.

Thus, the present application discloses an automated solution for producing captioning that is sensitive to one or more aesthetically determinative features of a media content unit. By automating an intelligent approach to determining a captioning aesthetic based at least in part on the one or more aesthetically determinative features, the captioning solution disclosed by the present application enables even a novice or artistically challenged user to produce visually pleasing and aesthetically engaging captioning. As a result, the present feature sensitive approach to captioning can be used to provide both a user and a viewer of media content with enhanced enjoyment deriving from captioning that is aesthetically resonant with the media content it describes.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A method for use by a system for performing feature sensitive captioning of media content, the method comprising:

detecting an aesthetically determinative feature of a media content unit selected by a user;

determining a captioning aesthetic for a caption of the media content unit based at least in part on the aesthetically determinative feature; and producing a feature sensitive caption for the media content unit utilizing the captioning aesthetic.

2. The method of claim 1, wherein producing the feature sensitive caption for the media content unit further comprises utilizing a caption content received from the user.

3. The method of claim 1, wherein determining the captioning aesthetic comprises determining a background aesthetic for the feature sensitive caption.

4. The method of claim 3, wherein determining the background aesthetic comprises determining a background color for the feature sensitive caption.

5. The method of claim 1, wherein determining the captioning aesthetic comprises determining a text aesthetic for the feature sensitive caption.

6. The method of claim 5, wherein determining the text aesthetic comprises determining a text color for the feature sensitive caption.

7. The method of claim 1, wherein determining the captioning aesthetic comprises determining a background aesthetic for the feature sensitive caption, and further comprises determining a text aesthetic for the feature sensitive caption based at least in part on the background aesthetic.

8. The method of claim 1, wherein the aesthetically determinative feature comprises at least one color detected in the media content unit.

9. The method of claim 1, wherein the aesthetically determinative feature comprises a most prevalent color detected in the media content unit.

10. The method of claim 1, wherein the system for producing feature sensitive captioning of media content comprises at least one of a media server, a desktop computer, a smart television (Smart TV), a laptop computer, a netbook, a tablet computer, a gaming console, and a Smartphone.

11. A system for performing feature sensitive captioning of media content, the system comprising:

a processor, and a memory having stored therein a feature sensitive captioning application configured to:

detect an aesthetically determinative feature of a media content unit selected by a user;

determine a captioning aesthetic for a caption of the media content unit based at least in part on the aesthetically determinative feature; and produce a feature sensitive caption for the media content unit utilizing the captioning aesthetic.

12. The system of claim 11, wherein the feature sensitive captioning application is further configured to produce the feature sensitive caption for the media content unit utilizing a caption content received from the user.

13. The system of claim 11, wherein determining the captioning aesthetic comprises determining a background aesthetic for the feature sensitive caption.

14. The system of claim 13, wherein determining the background aesthetic comprises determining a background color for the feature sensitive caption.

15. The system of claim 11, wherein determining the captioning aesthetic comprises determining a text aesthetic for the feature sensitive caption.

16. The system of claim 15, wherein determining the text aesthetic comprises determining a text color for the feature sensitive caption.

17. The system of claim 11, wherein determining the captioning aesthetic comprises determining a background aesthetic for the feature sensitive caption, and further comprises determining a text aesthetic for the feature sensitive caption based at least in part on the background aesthetic.

18. The system of claim 11, wherein the aesthetically determinative feature comprises at least one color detected in the media content unit.

19. The system of claim 11, wherein the aesthetically determinative feature comprises a most prevalent color detected in the media content unit.

20. The system of claim 11, wherein the system comprises at least one of a media server, a desktop computer, a smart television (Smart TV), a laptop computer, a netbook, a tablet computer, a gaming console, and a Smartphone.

* * * * *